United States Patent [19]
Goto

[11] Patent Number: 5,790,321
[45] Date of Patent: Aug. 4, 1998

[54] IMAGING OPTICAL SYSTEM

[75] Inventor: Hisashi Goto, Yokohama, Japan

[73] Assignee: Olympus Optical Co., Ltd., Tokyo, Japan

[21] Appl. No.: 240,531

[22] Filed: May 10, 1994

[30] Foreign Application Priority Data

May 11, 1993 [JP] Japan .................................. 5-132446

[51] Int. Cl.$^6$ ........................................... G02B 3/08
[52] U.S. Cl. .................................... 359/742; 359/571
[58] Field of Search ................................ 359/643, 652, 359/742, 745, 784, 791, 355, 356, 357, 565, 571

[56] References Cited

U.S. PATENT DOCUMENTS

| | | | |
|---|---|---|---|
| 5,044,706 | 9/1991 | Chen | 359/357 |
| 5,151,823 | 9/1992 | Chen | 359/565 |
| 5,268,790 | 12/1993 | Chen | 359/558 |
| 5,493,441 | 2/1996 | Chipper | 359/354 |

OTHER PUBLICATIONS

Farn et al: "Diffractive doublet corrected on-axis at two wavelenghts", SPIE –vol. 1354, International Lens Design Conference (1990) pp. 24–37.

*Primary Examiner*—Georgia Y. Epps
*Assistant Examiner*—Dawn-Marie Bey
*Attorney, Agent, or Firm*—Cushman Darby & Cushman IP Group of Pillsbury Madison & Sutro LLP

[57] ABSTRACT

An imaging optical system comprising at least one diffractive optical element having a positive refractive power, at least one refractive optical element having a positive refractive power and at least one refractive optical element having a negative refractive power; and characterized in that it favorably corrects aberrations, in particular, chromatic aberration.

14 Claims, 7 Drawing Sheets

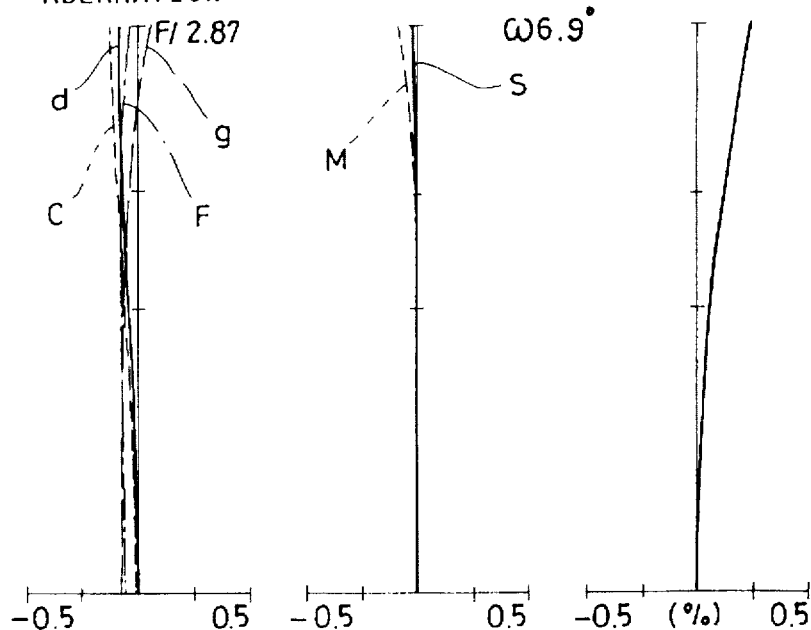
FIG. 2A SPHERICAL ABERRATION
FIG. 2B ASTIGMATISM
FIG. 2C DISTORTION
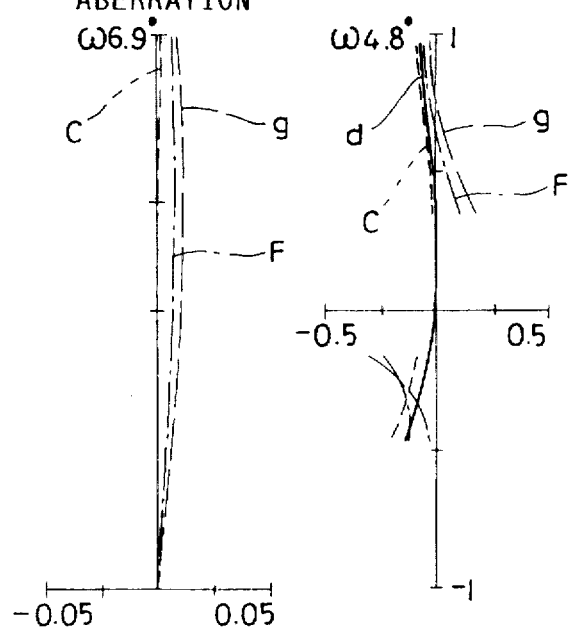
FIG. 2D LATERAL CHROMATIC ABERRATION
FIG. 2E COMA

FIG. 4A
SPHERICAL ABERRATION
FIG. 4B
ASTIGMATISM
FIG. 4C
DISTORTION
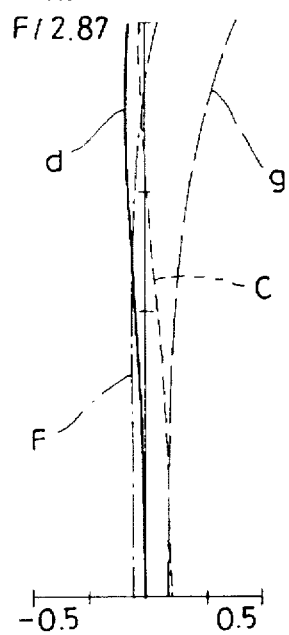
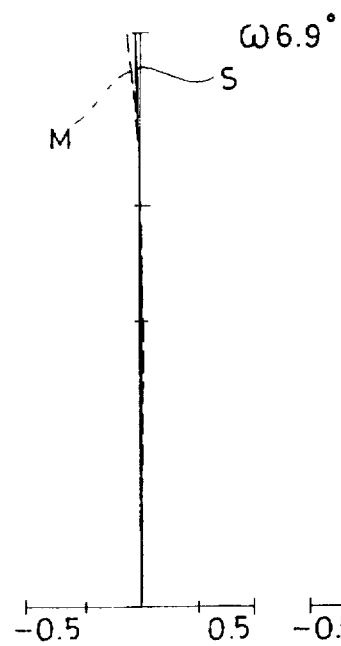
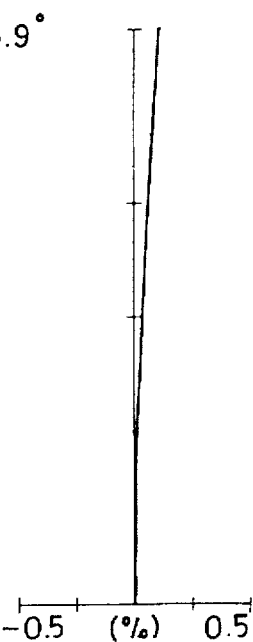
FIG. 4D
LATERAL CHROMATIC ABERRATION
FIG. 4E
COMA
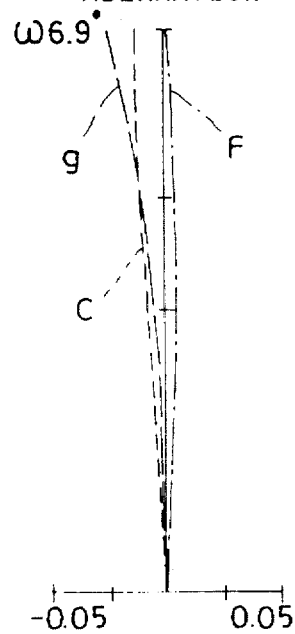
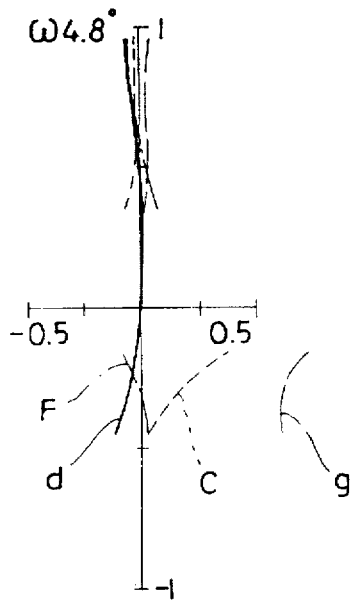

FOUR STEP
APPROXIMATION

EIGHT STEP
APPROXIMATION

IMAGING OPTICAL SYSTEM

BACKGROUND OF THE INVENTION a) Field of the Invention

The present invention relates to an imaging optical system which is capable of correcting chromatic aberration favorably.

b) Description of the Prior Art

It is generally desired for imaging optical systems to have excellent imaging performance. Speaking more concretely, it is desired for the imaging optical systems to function to converge rays which are emitted from a point precisely onto a single spot (spot converging function), function to correct distortion and curvature of field, and have a capability to converge, onto a single spot, rays having wavelengths which may be sensed by films, image pickup devices and so on (capability to correct chromatic aberration favorably).

There have conventionally been proposed a lot of imaging optical systems which have the desired imaging performance, and are designed with considerations of compact sizes, low manufacturing costs, high producibility and compatibility with imaging systems.

For obtaining imaging optical systems which have good spot imaging functions, aberrations have conventionally been corrected by combining refractive optical elements having positive refractive powers with refractive optical elements having negative refractive powers. Though it is known that a good spot converging function for a single object point can be obtained by using a single aspherical lens element or a single diffractive optical element, it is impossible to obtain a good spot converging function over an entire range of an image surface together with good functions to correct distortion and curvature of field by using a single aspherical lens element or a single diffractive optical element. Most of the lens systems referred to as telephoto lens systems, which have field angles 2ω smaller than 15°, in particular, select the so-called telephoto type composition which comprises, from the side of an object point, a diffractive optical element having a positive refractive power and a refractive optical element having a negative refractive power for shortening a total length of the lens systems.

A great cause of producing longitudinal chromatic aberration in an optical system is attributed to a fact that the optical system has a focal length which varies depending on wavelength. Consider an optical system which has a focal length, at a wavelength $\lambda_A$, A times as long as that at a standard wavelength $\lambda_d$. This optical system produces, at the wavelength $\lambda_A$, longitudinal chromatic aberration which is approximated by the following formula (3), taking longitudinal chromatic aberration at the wavelength $\lambda_d$ as standard:

$$\delta_{A,d} = (A-1)f \qquad (3)$$

wherein the reference symbol f represents a focal length of the optical system as a whole at the wavelength $\lambda_d$.

As is understood from this formula, the optical system is apt to produce chromatic aberration in larger amounts at longer wavelengths. In other words, it is difficult to correct chromatic aberration, in particular, in the telephoto lens systems.

In optical systems, chromatic aberration is generally corrected by utilizing a fact that different materials selected for optical elements comprising the optical systems have refractive indices which vary at different ratios depending on wavelength (dispersion ratios). In the case of an optical system which has a positive focal length, chromatic aberration is corrected by selecting a material which has a low dispersion ratio for the optical element having the positive refractive power and a material which has a high dispersion ratio for the optical element having the negative refractive power. When chromatic aberration is to be corrected by combining the optical elements as described above, however, it is necessary to take into consideration not only chromatic aberration but also imaging performance of the optical system over an entire range of an image surface. It is therefore difficult to correct chromatic aberration, in particular, in a telephoto lens system which has an aperture diameter not shorter than 1.2 times a diagonal length of an image surface thereof. For correcting chromatic aberration in such a telephoto lens system, it is necessary to use optical elements in an increased number or select a special glass material such as fluorite or ultra-low dispersion glass for the optical elements. However, fluorite is an expensive and soft material which can hardly be polished precisely into a desired form. Further, a refractive optical element made of a glass or plastic material has a refractive index which is lowered at longer wavelengths at a ratio which is different dependently on kinds of materials and lowered from short wavelengths toward long wavelengths.

FIG. 6 shows graphs illustrating wavelength-dependent variation of refractive indices of lens elements which are made of a typical glass material (BK7) and a ultra-low dispersion glass material (FK01) respectively, and have a refractive power (an inverse number of a focal length) of 1 at a wavelength of 550 nm. In FIG. 6, the abscissa represents wavelengths and the ordinate designates refractive indices. Further, FIG. 5 shows graphs illustrating deviations of rear focal points, taking focal points at 550 nm as standard, of an embodiment of the imaging optical system according to the present invention to be described later and a conventional optical system composed only of refractive optical elements. In FIG. 5, the absccisa represents wavelengths and the ordinate designates deviations of the rear focal points, whereas the graph traced in the solid line indicates the rear focal point of the conventional optical system composed only of the refractive optical system, and the graph traced in the dashed line indicates the rear focal point of the embodiment of the present invention.

Since the refractive optical element made of the ordinary glass material and the refractive optical element made of the ultra-low dispersion material have refractive powers which vary depending on wavelength in tendencies similar to each other, an imaging optical system made of materials selected within a practically available range produces longitudinal chromatic aberration varying along a V-shaped curve as indicated by the solid line in FIG. 5, whereby the imaging optical system forms images at the same location only at two wavelengths, and produces remarkable chromatic aberration at short wavelengths and long wavelengths.

On the other hand, the diffractive optical element has a refractive power which varies depending on wavelength as shown in FIG. 7, or a dispersion ratio which has a tendency to vary reverse to that of the refractive optical element and at a ratio higher than that of the refractive optical element. It is therefore possible to correct chromatic aberration in an optical system by composing it of a combination of diffractive optical elements having a positive refractive power and a refractive optical element having a positive refractive power as described on pages 24 to 37 of "SPIE", Vol. 1354. However, it is impossible to correct the other aberrations favorably in an imaging optical system which has an aperture diameter exceeding 1.5 times a diagonal length of an image surface thereof. In addition, the diffractive optical element poses a problem that it has a total diffraction efficiency which is rather low as compared with surface transmittance of the refractive optical element (a total sum of surface reflectance and surface transmittance is 100%) of the refractive optical element.

As a conventional example of zoom lens systems which adopt diffractive optical elements, there is known a lens system disclosed by U.S. Pat. No. 5,268,790. This zoom lens system consists of a focus group, a variator, a compensator and a prism group, and adopts the diffractive optical elements in a total number of two which are disposed in the variator or compensator.

SUMMARY OF THE INVENTION

A primary object of the present invention is to provide an imaging optical system which is capable of favorably correcting chromatic aberration and other aberrations.

The imaging optical system according to the present invention comprises at least one diffractive optical element having a positive refractive power, at least one refractive optical element having a positive refractive power and at least one refractive optical element having a negative refractive power.

The refractive optical element having the positive refractive power and the refractive optical element having the negative refractive power used in the imaging optical system according to the present invention function mainly to improve the spot converging function, and correct curvature of field, distortion and so on. The imaging optical system according to the present invention has a composition similar to that of the conventional imaging optical system, but the diffractive optical element which is used additionally allows the imaging optical system according to the present invention to correct chromatic aberration over a broad wavelength region. As seen from FIG. 6 and FIG. 7, the diffractive optical element not only has a high dispersing characteristic but also high linearity in the wavelength-dependent variation of refractive power in contrast to the low linearity in the wavelength-dependent variation of the refractive power of the refractive optical element.

A diffraction efficiency of the diffractive optical element can be enhanced by configuring the diffractive optical element so as to have a diffractive surface which has a saw-tooth-like sectional shape referred to as "kinoform". The diffractive optical element can be manufactured at a reduced cost when it is designed according to the binary optics which expresses the saw-tooth-like shape as a stepped shape.

Now, a brief description will be made below of the nature of the diffractive optical element. The diffractive optical element is an optical element which utilizes the diffraction phenomenon of light. Let us represent an angle of incidence of a ray on a diffraction grating by θ, designate an angle of emergence of the ray from the diffraction grating by θ', denote a number of diffraction order by m and represent a groove pitch on the diffraction grating by as shown in FIG. 8. Then, the diffraction phenomenon takes place as expressed by the following formula (4):

$$\sin\theta - \sin\theta' = m\lambda/d \quad (4)$$

On the other hand, let us pay attention to a light bundle of a specific number of order (m'th order). Then, it is possible to obtain a lens function which converges rays of the m'th order (the specific number of order) as illustrated in FIG. 9, for example, by continuously varying the groove pitch d. When a diffractive optical element is configured so as to have such a saw-tooth-like shape as that shown in FIG. 10 and a height of teeth which satisfies a relationship expressed by the equation (5), it is possible to obtain 100% of visible rays from incident rays having the wavelength of λ:

$$h = m\lambda/(n-1) \quad (5)$$

wherein the reference symbol n represents a refractive index of a base plate of the diffractive optical element.

Such a sectional shape is referred to as kinoform. A diffractive optical element which has a sectional shape obtained by approximating the kinoform to a stepped shape as shown FIG. 11 and FIG. 12 is often referred to as a binary optical element. The binary optical element can be manufactured relatively easily by utilizing the lithographic technique. It is known that diffractive efficiencies of 81%, 95% and 99% can be obtained by using binary optical elements which have sectional shapes approximated to four steps, eight steps and sixteen steps respectively. Further, it will be understood from the formula (4) that a lens element composed of a diffractive optical element has a focal length which varies dependently on wavelengths as expressed by the following formula (6):

$$\lambda \cdot f(\lambda) = \text{const.} \quad (6)$$

wherein the reference symbol $f(\lambda)$ represents a focal length of the lens element composed of the diffractive optical element at the wavelength λ.

This lens element has an inverse dispersion characteristic which can be expressed as $v_d = -3.45$ in terms of the so-called Abbe's number.

Further, it is known that the relationship expressed by the formula (7) shown below applies to a lens element having a sectional shape of the kinoform:

$$k = \sin^2[\pi(\lambda_0/\lambda - m)]/[\pi(\lambda_0/\lambda - m)]^2 \quad (7)$$

wherein the reference symbol k represents a diffraction efficiency, at the wavelength λ, of a lens element which has a sectional shape of the kinoform and a diffraction efficiency of 100% at a wavelength of $\lambda_0$.

Diffractive optical elements which have strong refractive powers must have large differences in groove pitch between central portions and marginal portions thereof and can hardly be manufactured in practice or pose a problem of manufacturing costs which are enhanced due to lowering of yields. In addition, such diffractive optical elements have lowered total diffraction efficiencies.

However, the imaging optical system according to the present invention does not require using a diffractive optical element having a strong refractive power since the imaging optical system has the composition described above in which aberrations are corrected almost completely only with the refractive optical elements.

For the diffractive optical element to be used in the imaging optical system according to the present invention, it is more desirable to select a refractive power which satisfies the following condition (1):

$$0.005 < f/f_{DOE} < 0.05 \quad (1)$$

wherein the reference symbol f represents a focal length of the imaging optical system as a whole and the reference symbol $f_{DOE}$ designates a focal length of the diffractive optical element.

If the lower limit of 0.005 of the condition (1) is not reached, it is impossible to correct chromatic aberration sufficiently favorably in the imaging optical system. If the upper limit of 0.05 of the condition (1) is exceeded, it will be practically difficult to manufacture the diffractive optical element.

A single diffractive optical element is sufficient for the imaging optical system according to the present invention since it is composed of the combination of the diffractive optical element and the refractive optical elements, and the optical performance of the imaging optical system is scarcely influenced by the diffraction efficiency of the diffractive optical element. It is further desirable that the imaging optical system satisfies the following condition (2):

$$0.85 < (\int E(\lambda) \cdot T(\lambda) \cdot B(\lambda) \cdot d\lambda / \int T(\lambda) \cdot B(\lambda) \cdot d\lambda) < 1 \quad (2)$$

wherein the reference symbol $E(\lambda)$ represents a diffraction efficiency of the diffractive optical element at the wavelength $\lambda$, the reference symbol $T(\lambda)$ designates transmittance of the imaging optical system as a whole at the wavelength $\lambda$ and the reference symbol $B(\lambda)$ denotes a spectral sensitivity characteristic at the wavelength $\lambda$ of an image pickup device used in combination with the imaging optical system.

The reference symbol $T(\lambda)$ represents transmittance of the imaging optical system at the wavelength $\lambda$, or designates a ratio of an amount of rays attaining to an imaging surface of the image pickup device relative to an amount of rays incident on the imaging optical system. Concretely, $T(\lambda)$ is calculated from the amount of rays including rays which are not used as image forming light bundles for designing, such as useless-ordered light bundles of the diffractive optical element.

If the lower limit of 0.85 of the condition (2) is not reached, flare will be remarkable on an imaging surface, thereby making it impossible to obtain a favorable image even when the image is adjusted at a development stage and/or reproduction stage thereof.

It is desirable that a wavelength $\lambda_{MAX}$ at which the diffractive optical element disposed in the imaging optical system has a maximum diffraction efficiency is set within a range defined below:

*450* nm$<\lambda_{MAX}<$600 nm

When $\lambda_{MAX}$ is set within the range defined above, it will be easy to configure the imaging optical system so as to satisfy the condition (2). FIG. 13 shows a graph illustrating diffraction efficiencies of the diffractive optical element which has the sectional shape of the kinoform when $\lambda_{MAX}$ is set at 510 nm.

BRIEF DESCRIPTION OF THE DRAWINGS

FIG. 2A, FIG. 2B, FIG. 2C, FIG. 2D and FIG. 2E show graphs illustrating aberration characteristics of the embodiment of the present invention;

FIG. 4A, FIG. 4B, FIG. 4C, FIG. 4D and FIG. 4E show curves visualizing aberration characteristics of the optical system shown in FIG. 3;

DETAILED DESCRIPTION OF THE PREFERRED EMBODIMENTS

Figure 1:
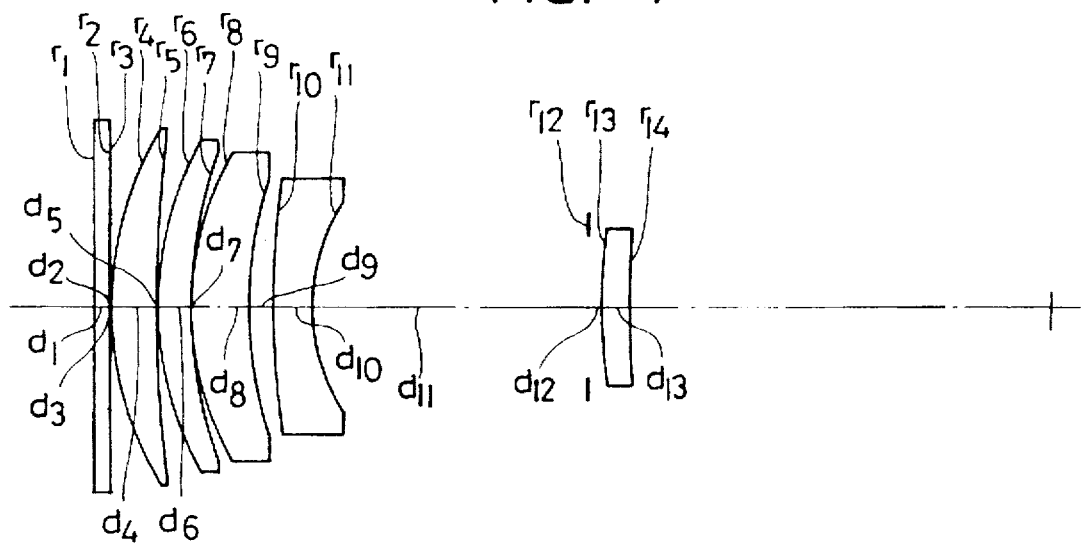
FIG. 1 shows a sectional view illustrating a composition of an embodiment of the imaging optical system according to the present invention.

Now, the imaging optical system according to the present invention will be described in more detail below with reference to the preferred embodiment illustrated in the accompanying drawings. The preferred embodiment of the imaging optical system has a composition illustrated in FIG. 1 and numerical data are listed below:

| | | | |
|---|---|---|---|
| $r_1 = \infty$ | | | |
| | $d_1 = 1.67$ | $n_1 = 1.51633$ | $v_1 = 64.15$ |
| $r_2 = \infty$ | | | |
| | $d_2 = 0.01$ | | |
| $r_3 = \infty$ | | | |
| | $d_3 = 0.06$ (surfaces of diffractive optical element) | | |
| $r_4 = 35.316$ | | | |
| | $d_4 = 4.55$ | $n_3 = 1.63930$ | $v_3 = 44.88$ |
| $r_5 = 155.367$ | | | |
| | $d_5 = 0.10$ | | |
| $r_6 = 35.104$ | | | |
| | $d_6 = 3.13$ | $n_4 = 1.63854$ | $v_4 = 55.38$ |
| $r_7 = 45.851$ | | | |
| | $d_7 = 0.08$ | | |
| $r_8 = 32.034$ | | | |
| | $d_8 = 5.63$ | $n_5 = 1.69350$ | $v_5 = 50.81$ |
| $r_9 = 43.533$ | | | |
| | $d_9 = 2.49$ | | |
| $r_{10} = 93.986$ | | | |
| | $d_{10} = 3.62$ | $n_6 = 1.76182$ | $v_6 = 26.55$ |
| $r_{11} = 18.750$ | | | |
| | $d_{11} = 27.71$ | | |
| $r_{12} = $ Stop | | | |
| | $d_{12} = 1.24$ | | |
| $r_{13} = 54.335$ | | | |
| | $d_{13} = 2.88$ | $n_7 = 1.72151$ | $v7 = 29.24$ |
| $r_{14} = 126.188$ | | | |
| $f = 100$, F NO $= 2.87$, $2\omega = 13.8°$, $f_{DOE} = 4264.11$ | | | |

In the numerical data listed above, the reference symbols $r_1, r_2, \ldots$ represent radii of curvature on surfaces of respective optical elements, the reference symbols $d_1, d_2, \ldots$ designate airspaces reserved among the surfaces of the respective optical elements, the reference symbols $n_1, n_2, \ldots$ denote refractive indices of the respective optical elements, and the reference symbols $v_1, v_2, \ldots$ represent Abbe's numbers of the respective optical elements. In the numerical data, the reference symbols $r_1$ and $r_2$ designate surfaces of a base plate for the diffractive optical element which is disposed on the surface $r_2$. That is to say, the reference symbols $r_3$ and $d_3$ designate the diffractive optical element. Since diffractive optical elements can be designed by using ultra-high index lens elements, the diffractive optical element adopted for the imaging optical system according to the present invention was manufactured by using a ultra-high index lens element.

The embodiment of the present invention consists of a diffractive optical element which is disposed on the object side and has a positive refractive power; and three positive meniscus lens components having convex surfaces on the object side, a negative meniscus lens component having a convex surface on the object side, an aperture stop and a positive lens component which are disposed on the image side of the diffractive optical element. That is to say, the imaging optical system according to the present invention comprises a single diffractive optical element, four refractive optical elements having positive refractive powers and a refractive optical element having a negative refractive power. Aberration characteristics of the embodiment of the present invention are visualized in FIG. 2A, FIG. 2B, FIG. 2C, FIG. 2D and FIG. 2E.

Figure 3:
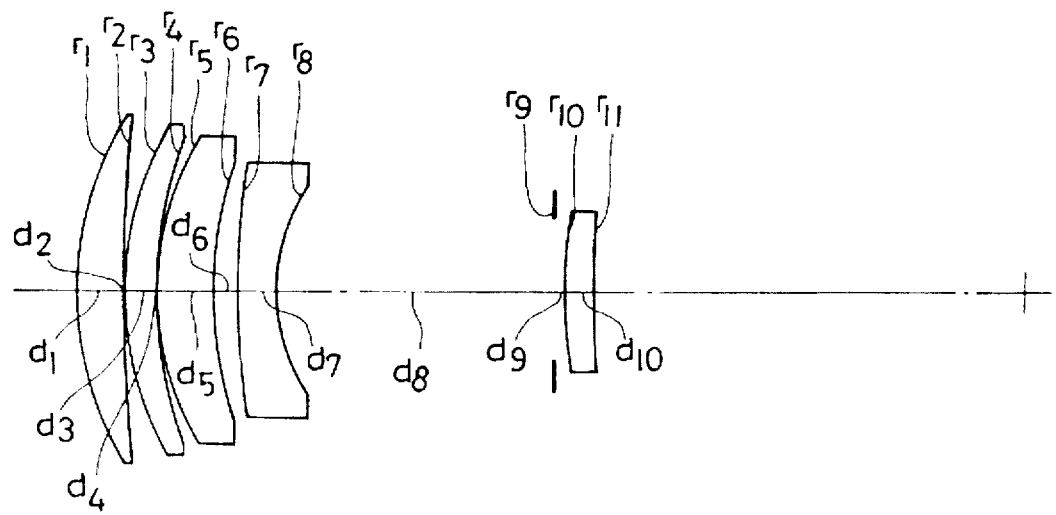
FIG. 3 shows a sectional view illustrating an optical system which is composed only of refractive optical elements.

Further, FIG. 3 shows an optical system which is obtained by removing the diffractive optical element from the imaging optical system shown in FIG. 1 and has the numerical data listed below:

| | | | |
|---|---|---|---|
| $r_1 = 35.345$ | | | |
| | $d_1 = 4.55$ | $n_1 = 1.63854$ | $v_1 = 55.38$ |
| $r_2 = 155.061$ | | | |
| | $d_2 = 0.10$ | | |
| $r_3 = 35.042$ | | | |
| | $d_3 = 3.13$ | $n_2 = 1.63854$ | $v_2 = 55.38$ |
| $r_4 = 46.026$ | | | |
| | $d_4 = 0.08$ | | |
| $r_5 = 31.922$ | | | |
| | $d_5 = 5.63$ | $n_3 = 1.69350$ | $v_3 = 50.81$ |
| $r_6 = 43.494$ | | | |
| | $d_6 = 2.49$ | | |
| $r_7 = 94.289$ | | | |
| | $d_7 = 3.63$ | $n_4 = 1.76182$ | $v_4 = 26.55$ |
| $r_8 = 18.747$ | | | |
| | $d_8 = 27.70$ | | |
| $r_9 = \text{Stop}$ | | | |
| | $d_9 = 1.22$ | | |
| $r_{10} = 52.743$ | | | |
| | $d_{10} = 2.88$ | $n_5 = 1.72151$ | $v_5 = 29.24$ |
| $r_{11} = 125.676$ | | | |
| $f = 100$, $F\,NO = 2.87$, $2\omega = 13.8°$ | | | |

This optical system has aberration characteristics which are illustrated in FIG. 4A, FIG. 4B, FIG. 4C, FIG. 4D and FIG. 4E.

Figure 5:
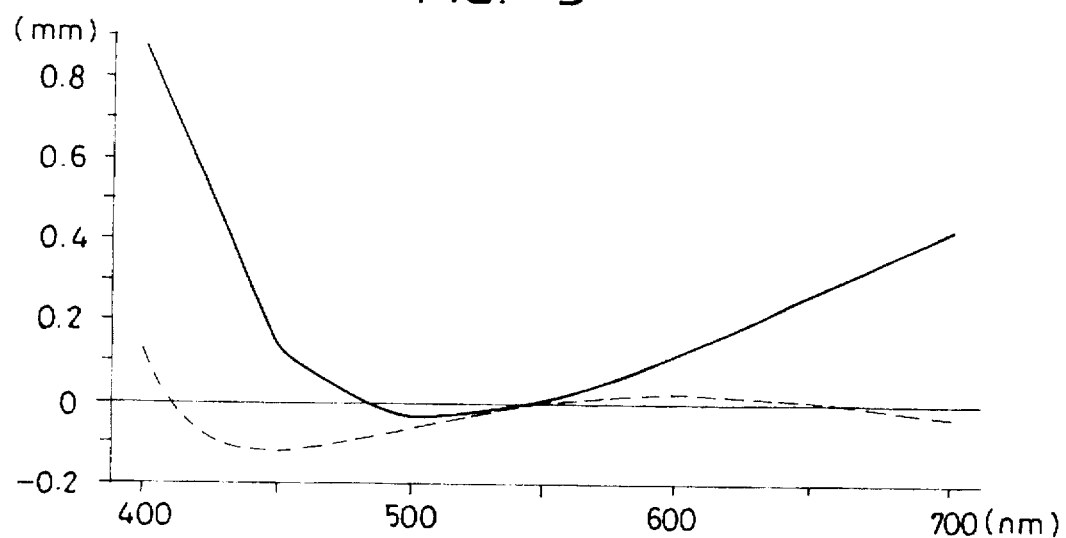
FIG. 5 shows graphs visualizing relations of rear focal points of the embodiment of the present invention and the optical system shown in FIG. 3 versus wavelengths.
Figure 6:
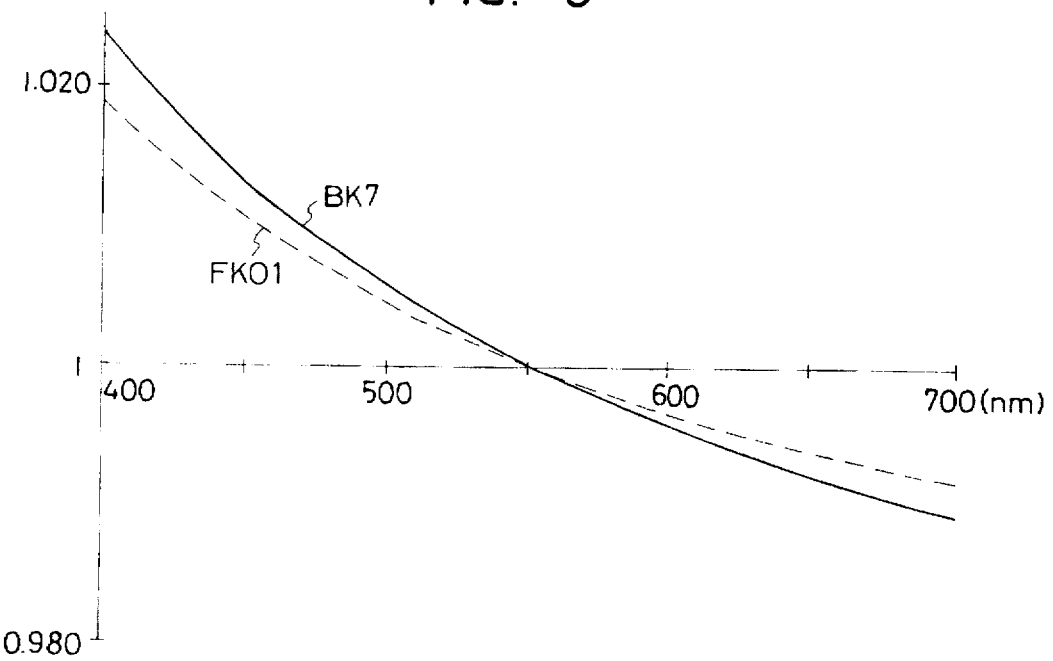
FIG. 6 shows graphs illustrating relations of refractive powers of refractive optical elements versus wavelengths.
Figure 7:
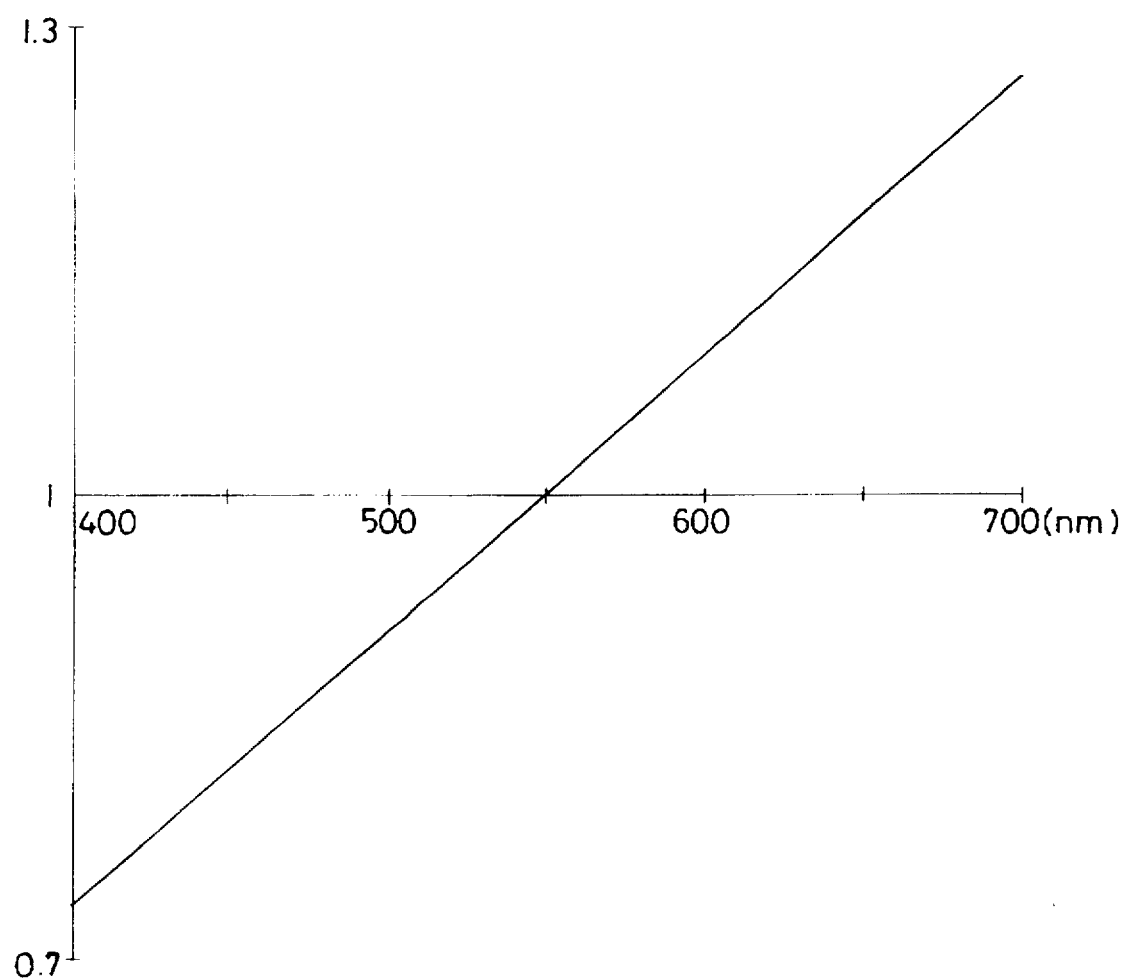
FIG. 7 shows a graph visualizing refractive powers of a diffractive optical element versus wavelengths.
Figure 8:
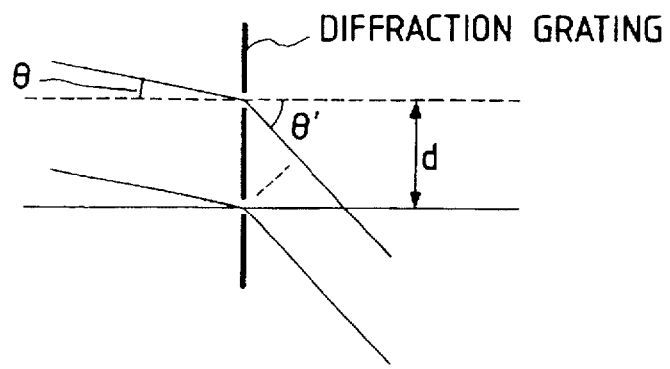
FIG. 8 shows a diagram illustrating deflection of a ray by a diffraction grating.
Figure 9:
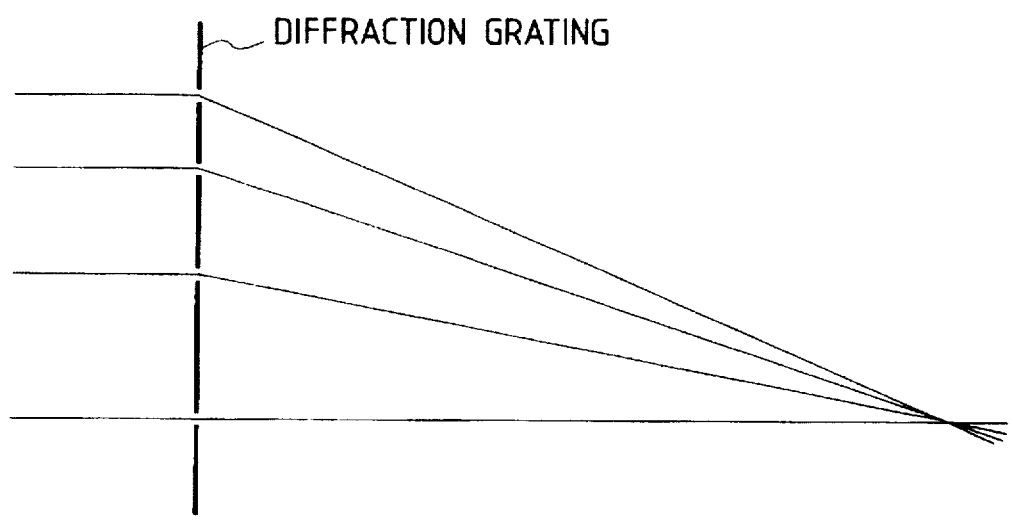
FIG. 9 shows a diagram illustrating lens function by a diffraction grating.
Figure 10:
FIG. 10 shows a diagram illustrating a sectional shape of the kinoform.
Figure 11:
FIG. 11 and FIG. 12 show diagrams illustrating sectional shapes of optical elements.
Figure 12:
Figure 13:
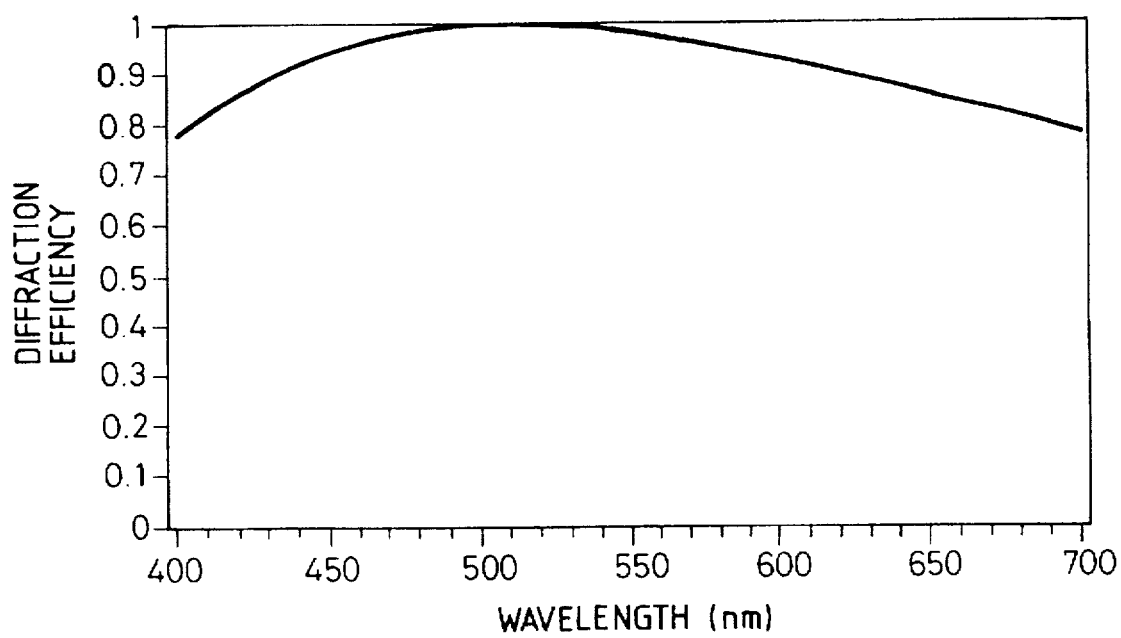
FIG. 13 shows a graph illustrating a diffraction efficiency of a diffractive optical element.

By comparing the aberration characteristics of the embodiment of the present invention shown in FIGS. 2A through 2E with those of the optical system shown in FIG. 3 which are illustrated in FIGS. 4A through 4E, it will be clear that chromatic aberration is reduced in the imaging optical system according to the present invention. FIG. 5 shows graphs illustrating rear focal points of the imaging optical system according to the present invention and the optical system shown in FIG. 5 which is composed only of the refractive optical elements at various wavelengths taking 550 nm as standard. As is seen from these graphs, the imaging optical system according to the present invention has a rear focal point which is less varied depending on wavelength and located at the same location at three different wavelengths. Further, it is estimated from the formula (3) that chromatic aberration is not remarkable in the imaging optical system according to the present invention even when it has a long focal length.

It is possible, by using an aspherical surface or imparting an effect of an aspherical surface to the diffractive optical element, to improve the spot converging function as well as the functions to correct curvature of field and distortion of the embodiment of the present invention, and reduce the number of the refractive optical elements used in the imaging optical system according to the present invention.

A manufacturing cost of the diffractive optical element can be lowered by designing the diffractive surface thereof according to binary optics and configuring the surface by the replica technique. Further, it is possible to configure the base plate of the diffractive optical element so as to have a filter function or design a lens barrel used for fixing the base plate so that a filter can be mounted thereon. Moreover, it is possible to combine the diffractive optical element with a filter which is matched with the diffraction efficiency thereof.

In addition, it is possible to eliminate flare produced by rays which are not diffracted as DC components when a photoelectric converter element such as a CCD sensor is to be used as an image pickup device. When an imaging optical system is to be used for forming colored images, transmittance of each filter can be controlled so as to be matched with a spectral characteristics of the diffractive optical element. For an image to be photographed on a film, an influence due to flare can be reduced by selecting a rather less exposure at a photographing stage, using a photographic paper having high contrast at a stage to print the image from a photographic paper, or selecting a rather long time with less exposure at a development stage.

We claim:
1. An imaging optical system comprising:
    at least one diffractive optical element having a positive refractive power, said at least one diffractive optical element condensing a first order diffracted light;
    at least one first refractive optical element having a positive refractive power; and
    at least one second refractive optical element having a negative refractive power;
    wherein said imaging optical system satisfies the following condition (1) regardless of a focal length of said imaging optical system as a whole:

$$0.005 < f/f_{DOE} < 0.05 \tag{1}$$

wherein the reference symbol f represents a focal length of said imaging optical system as a whole and the reference symbol $f_{DOE}$ designates a focal length of said at least one diffractive optical element.

2. An imaging optical system according to claim 1, wherein:
    said at least one diffractive optical element has a diffractive surface which has a shape of a kinoform.

3. An imaging optical system according to claim 1, wherein:
    said at least one diffractive optical element has a diffractive surface which has a shape approximated to a binary shape having at least eight steps.

4. An imaging optical system according to claim 1, 2 or 3, wherein said imaging optical system further comprises:
    a filter.

5. An imaging optical system according to claim 1, wherein:
    said at least one diffractive optical element is only one diffractive optical element.

6. An imaging apparatus comprising:
    an imaging optical system including at least one diffractive optical element having a positive refractive power, said at least one diffractive optical element condensing a first order diffracted light;
    at least one first refractive optical element having a positive refractive power;
    at least one second refractive optical element having a negative refractive power; and
    an image pickup device for receiving an image formed by said at least one diffractive optical element, said at least one first refractive optical element, and said at least one second refractive optical element;

wherein said imaging apparatus satisfies the following condition (2):

$$0.85 < \frac{\int E(\lambda) \cdot T(\lambda) \cdot B(\lambda) \cdot d\lambda}{\int T(\lambda) \cdot B(\lambda) \cdot d\lambda} \quad (2)$$

wherein the reference symbol $E(\lambda)$ represents a diffraction efficiency of said at least one diffractive optical element at a wavelength $\lambda$, the reference symbol $T(\lambda)$ designates transmittance of said at least one diffractive optical element, said at least one first refractive optical element, and said at least one second refractive optical element as a whole at the wavelength $\lambda$, and the reference symbol $B(\lambda)$ denotes a spectral sensitivity characteristic of said image pickup device.

7. An imaging apparatus according to claim 6, wherein:

said at least one diffractive optical element has a diffractive surface which has a shape of a kinoform.

8. An imaging apparatus according to claim 6, wherein:

said at least one diffractive optical element has a diffractive surface which has a shape approximated to a binary shape having at least eight steps.

9. An imaging apparatus according to claim 6, 7 or 8, wherein:

said at least one diffractive optical element satisfies the following condition:

450 nm$<\lambda_{MAX}<$600 nm wherein the reference symbol $\lambda_{MAX}$ represents a wavelength at which said at least one diffractive optical element has a maximum diffraction efficiency.

10. An imaging apparatus according to claim 9, wherein said imaging optical system further includes:

a filter.

11. An imaging apparatus according to claim 7 or 8, wherein said imaging optical system further includes:

a filter.

12. An imaging apparatus according to claim 6, wherein:

said at least one diffractive optical element is only one diffractive optical element.

13. An imaging optical system comprising:

at least one diffractive optical element having a positive refractive power, said at least one diffractive optical element condensing a first order diffracted light;

at least one first refractive optical element having a positive refractive power; and at least one second refractive optical element having a negative refractive power;

wherein said at least one diffractive optical element satisfies the following condition:

450 nm$<\lambda_{MAX}<$600 nm wherein the reference symbol $\lambda_{MAX}$ represents a wavelength at which said at least one diffractive optical element has a maximum diffractive efficiency.

14. An imaging optical system according to claim 13, wherein:

said at least one diffractive optical element is only one diffractive optical element.

* * * * *